(12) United States Patent
Veitch et al.

(10) Patent No.: US 11,067,121 B2
(45) Date of Patent: Jul. 20, 2021

(54) MULTI-FILM OIL DAMPER WITH TAPERED DAMPER RINGS

(71) Applicant: PRATT & WHITNEY CANADA CORP., Longueuil (CA)

(72) Inventors: Thomas Veitch, Toronto (CA); David Beamish, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/355,986

(22) Filed: Mar. 18, 2019

(65) Prior Publication Data
US 2020/0300113 A1 Sep. 24, 2020

(51) Int. Cl.
*F16C 27/04* (2006.01)
*F01D 25/16* (2006.01)
*F16F 15/02* (2006.01)
*F16F 15/023* (2006.01)

(52) U.S. Cl.
CPC .......... *F16C 27/045* (2013.01); *F01D 25/164* (2013.01); *F16F 15/0237* (2013.01); *F05D 2240/54* (2013.01); *F05D 2260/96* (2013.01); *F16C 2360/23* (2013.01); *F16F 2222/12* (2013.01)

(58) Field of Classification Search
CPC . F16C 27/045; F16C 2360/23; F16F 15/0273; F16F 2222/12; F05D 2240/50; F05D 2260/96; F01D 25/16; F01D 25/164
See application file for complete search history.

(56) References Cited

U.S. PATENT DOCUMENTS

| 2,440,890 | A | * | 5/1948 | Birmann | F01D 25/164 384/320 |
| 3,499,691 | A | | 3/1970 | Baier | |
| 4,214,796 | A | * | 7/1980 | Monzel | F01D 25/164 384/202 |
| 4,289,360 | A | * | 9/1981 | Zirin | F16F 15/0237 384/462 |
| 4,775,248 | A | | 10/1988 | Barbic et al. | |
| 4,992,024 | A | * | 2/1991 | Heydrich | F01D 25/164 384/99 |
| 5,046,718 | A | | 9/1991 | Hay, II | |
| 8,342,796 | B2 | | 1/2013 | Spencer et al. | |

(Continued)

FOREIGN PATENT DOCUMENTS

| GB | 2033495 A | 5/1980 |
| JP | S63-89426 U | 6/1988 |

OTHER PUBLICATIONS

European Search report issued in counterpart application No. 20163974.7 dated Sep. 17, 2020.

*Primary Examiner* — Alan B Waits
(74) *Attorney, Agent, or Firm* — Norton Rose Fulbright Canada LLP

(57) ABSTRACT

A multi-film oil damper has a housing defining an annular damper cavity between a radially outward wall and radially extending side walls. The annular damper cavity has an oil inlet configured for connection to a source of pressurized oil. A closure ring defines a radially inward boundary of the annular damper cavity. First and second damper rings are nested together coaxially within the annular damper cavity. At least one of the first damper ring and the second damper ring has an axial end radial thickness less than an intermediate-portion radial thickness.

11 Claims, 6 Drawing Sheets

(56) References Cited

U.S. PATENT DOCUMENTS

| | | |
|---|---|---|
| 8,919,499 B2 | 12/2014 | Delamour et al. |
| 9,841,056 B2 | 12/2017 | Snow et al. |
| 9,890,810 B2 | 2/2018 | Kawashita et al. |
| 2007/0086685 A1 | 4/2007 | Klusman et al. |
| 2009/0263057 A1 | 10/2009 | Kanki et al. |
| 2016/0138421 A1 | 5/2016 | Duong et al. |

\* cited by examiner

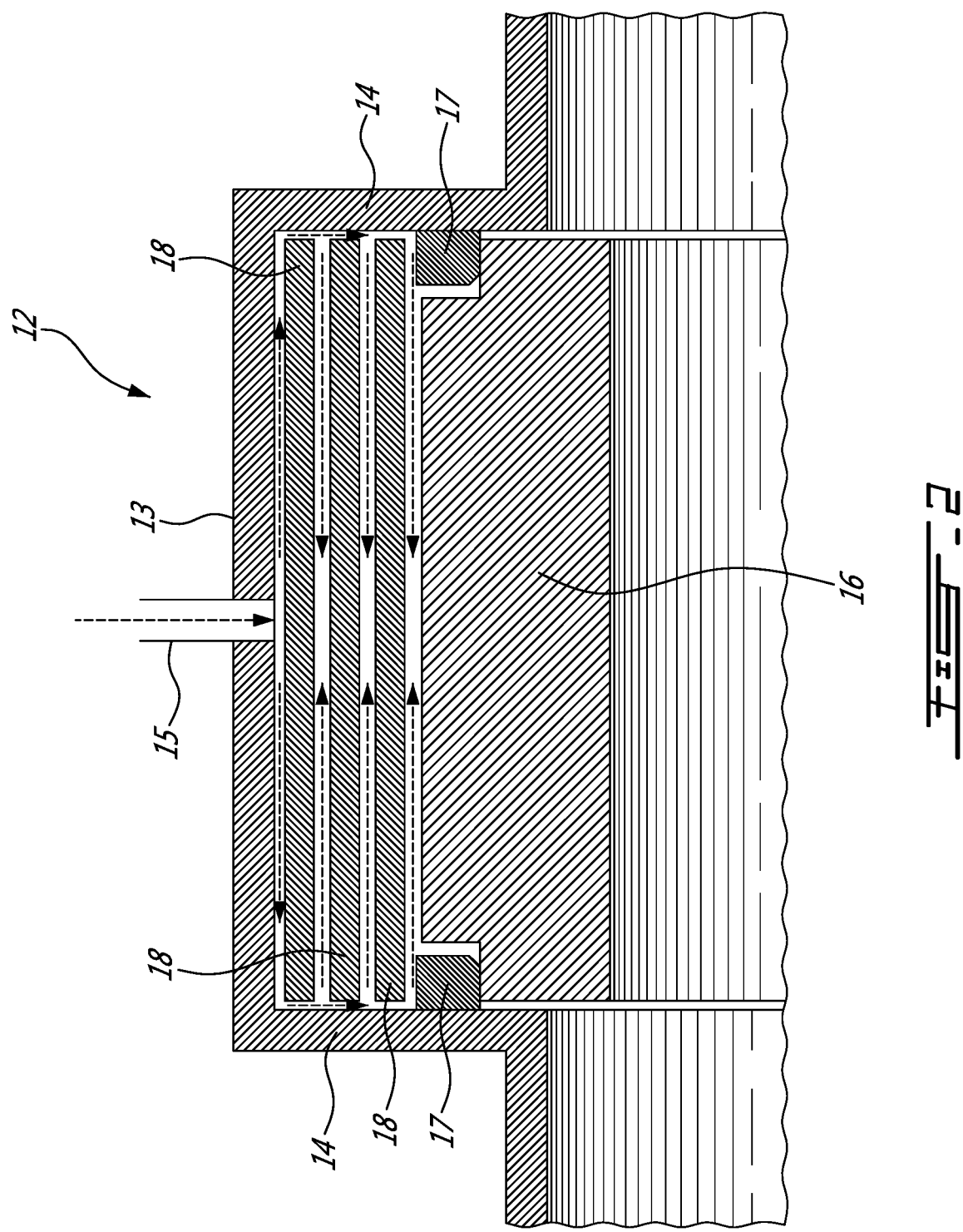

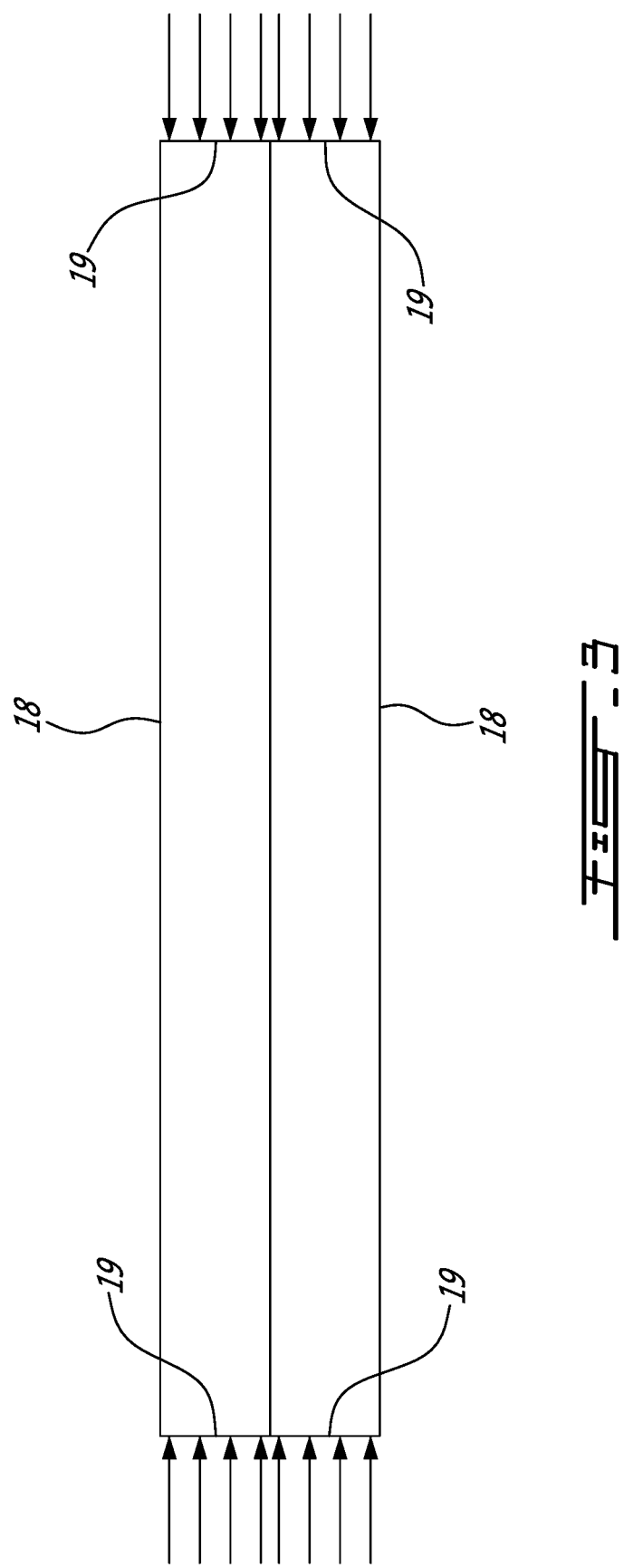

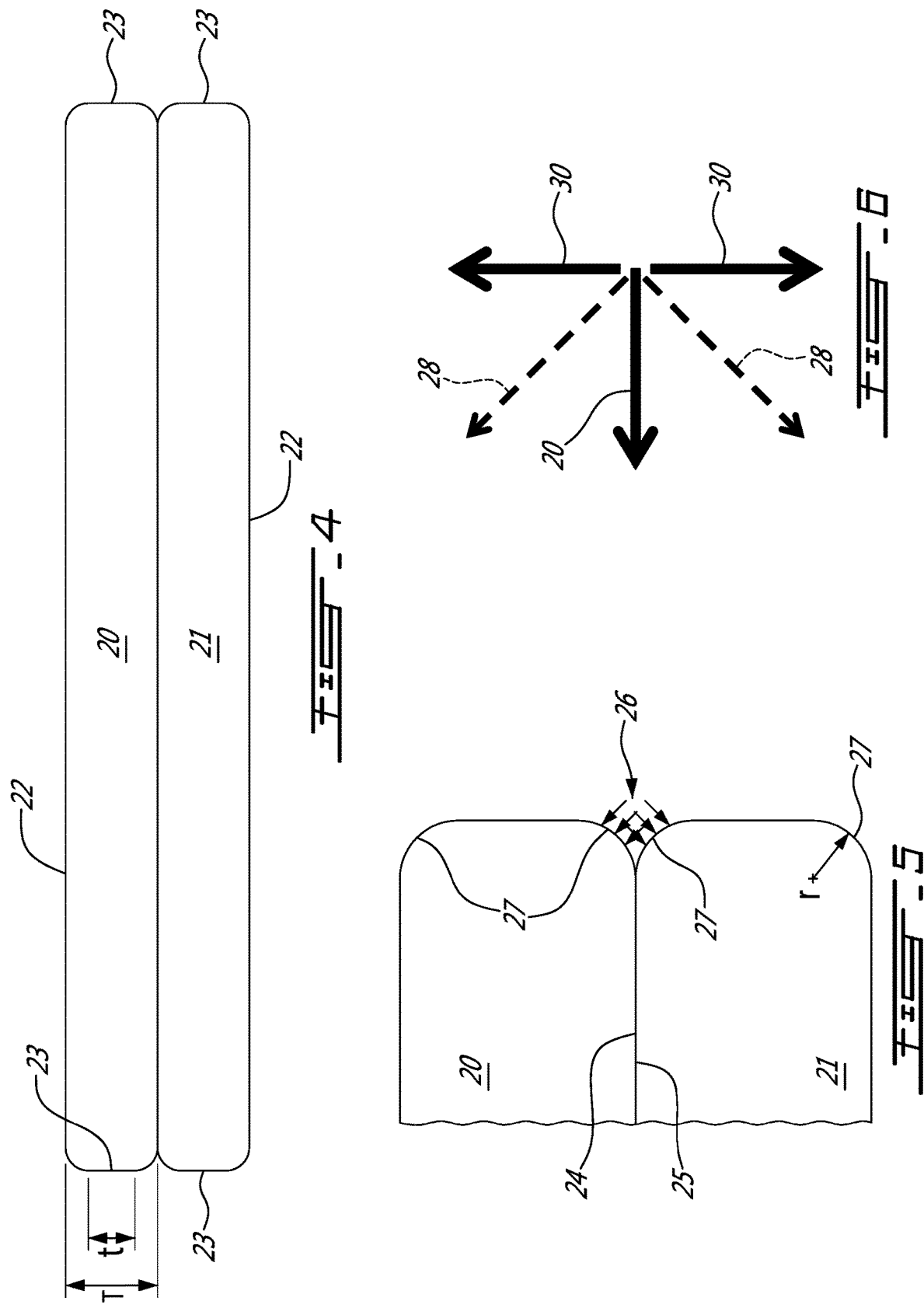

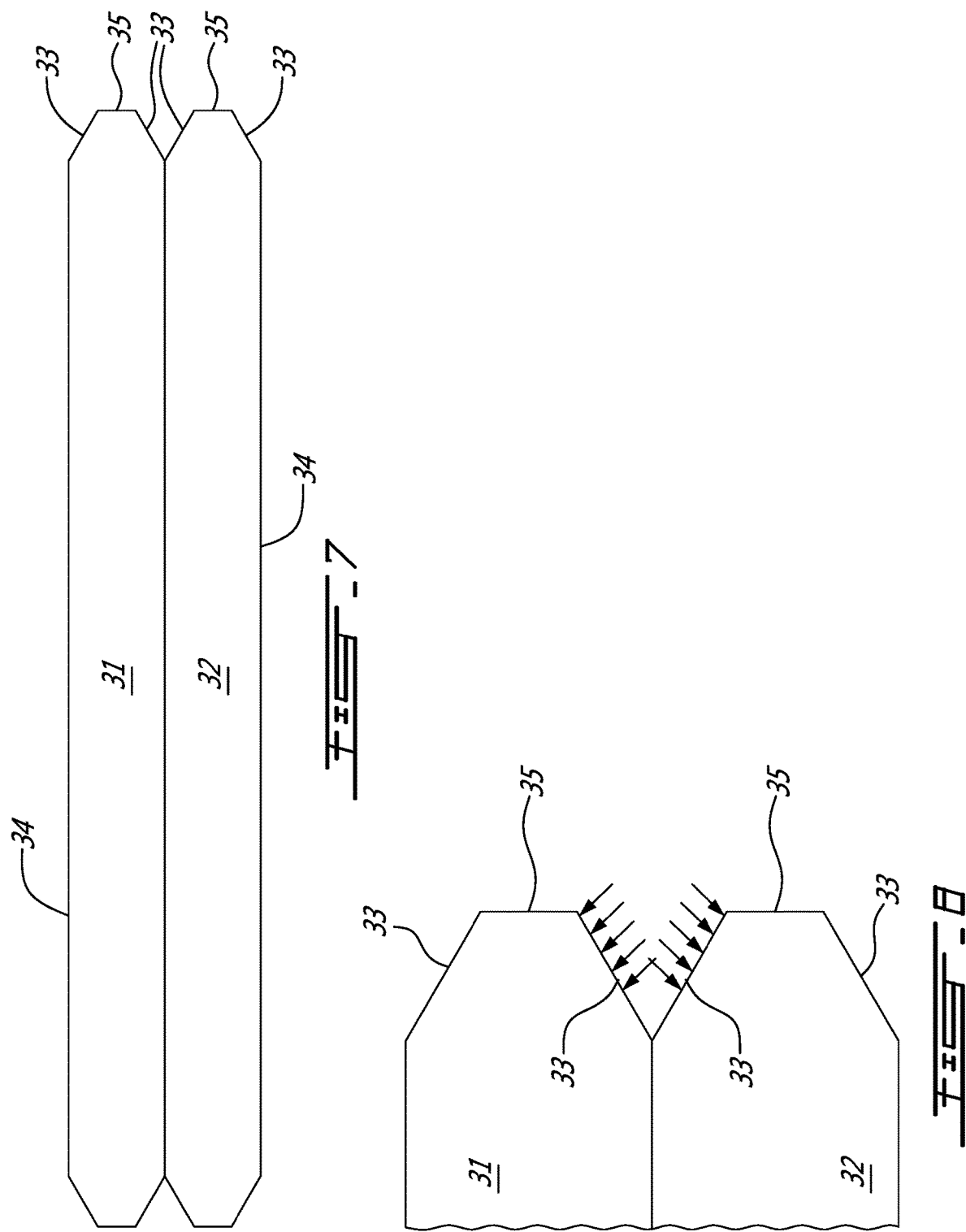

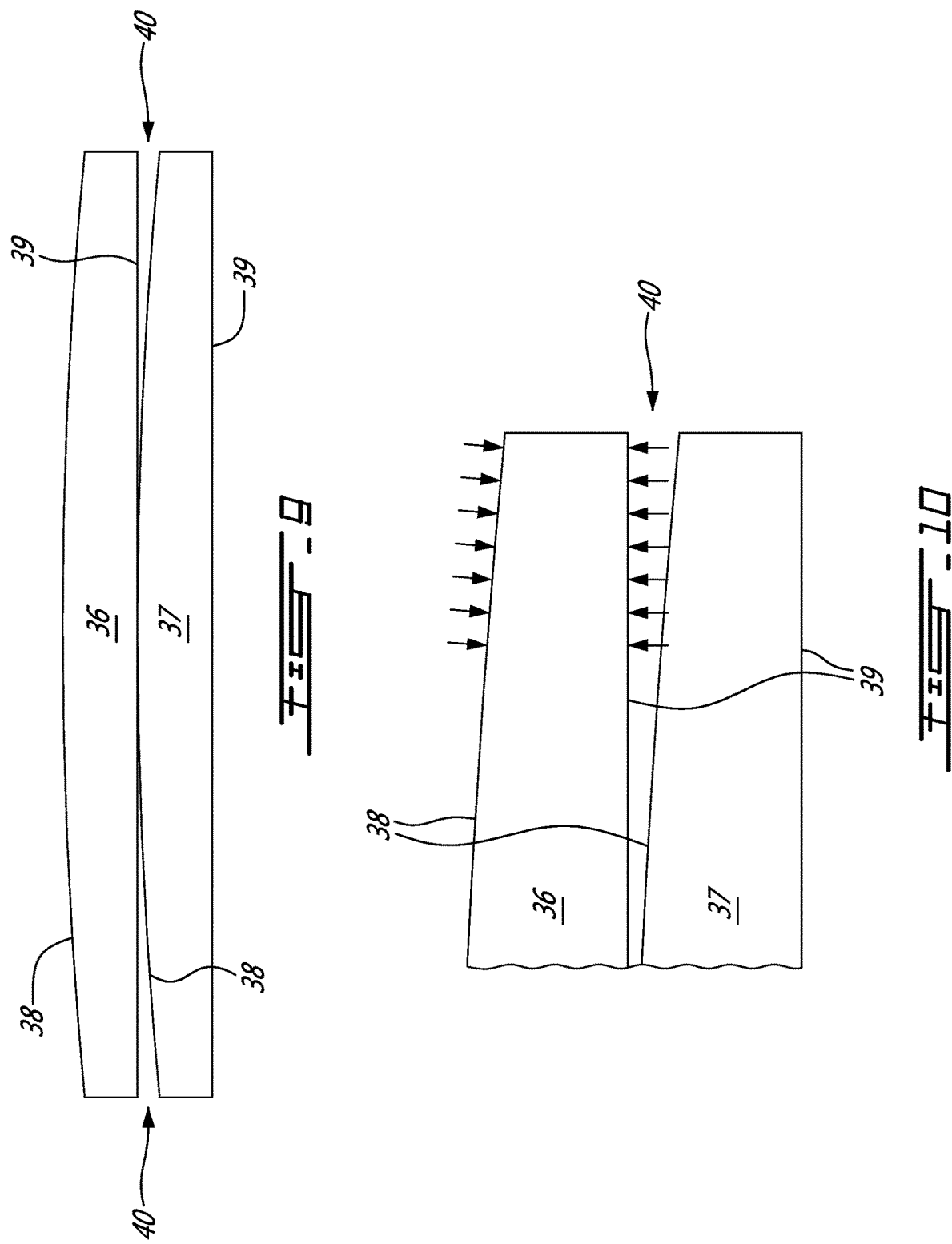

MULTI-FILM OIL DAMPER WITH TAPERED DAMPER RINGS

TECHNICAL FIELD

The disclosure generally relates to squeeze film dampers and, more particularly, to a method and arrangement for distributing oil between nested damper rings.

BACKGROUND

Squeeze film oil dampers with a single oil film are well known and used throughout the gas turbine and turbomachinery industry. Oil dampers are typically placed in series with the rotor system bearing supports and provide damping to a rotor system to reduce vibrations that would otherwise be present in the system. In some cases, such as high rotor imbalance, a large amount of radial damping movement is needed beyond the capacity of a single film. Accordingly a multi-film damper can be used to increase the capacity for radial movement and damping.

For proper function of an oil film damper with multiple films, each of the films should be substantially free of air voids and supplied with sufficient oil flow under pressure. The oil film damper is supplied with oil from an oil supply inlet, often in the outer diameter of the damper cavity. In a multi-film damper the adequate flow of oil between rings can be impeded and failure to coat damper rings with individual oil films between each damper ring can degrade the performance of the oil damper.

The interaction of the multiple nested damper rings and the oil can impede oil distribution. For example a thin layer of liquid oil between adjacent damper rings can impede separating the damper rings due to the attractive force of liquid surface tension. Failure to separate the damper rings sufficiently can impede the flow of oil between the damper rings and result in an insufficient coating of oil film for reliable functioning of the oil damper. Improvement is thus desirable.

SUMMARY

In one aspect, the disclosure describes a multi-film oil damper comprising: a housing defining an annular damper cavity between a radially outward wall and radially extending side walls, the annular damper cavity having an oil inlet configured for connection to a source of pressurized oil; a closure ring defining a radially inward boundary of the annular damper cavity; a first and a second damper ring nested together coaxially within the annular damper cavity; and wherein at least one of the first damper ring and the second damper ring has an axial end radial thickness less than an intermediate-portion radial thickness.

In another aspect, there is provided a gas turbine engine comprising: a rotary shaft bearing; a bearing housing; and a multi-film oil damper for accommodating radial movement of the rotary shaft bearing relative to the bearing housing, the multi-film oil damper comprising: an annular damper cavity defined within the bearing housing between a radially outward wall and radially extending side walls, the annular damper cavity having an oil inlet in communication with a source of pressurized oil; a closure ring having axial ends abutting the radially extending side walls of the annular damper cavity and defining a radially inward boundary of the annular damper cavity; a first and a second damper ring nested coaxially within the annular damper cavity, wherein the first damper ring and the second damper ring, have an inner surface, an outer surface and axial ends, the axial ends defining a wedge gap between the first damper ring and the second damper ring.

In a further aspect, the disclosure describes a method of distributing oil between the coaxial damper rings of a multi-film oil damper, the method comprising: sealing an oil damper cavity with a radially moveable closure ring; injecting pressurized oil into the oil damper cavity via an oil inlet; providing a first damper ring and a second damper ring within the oil damper cavity, the first damper ring and the second damper ring having spaced apart adjacent axial end surfaces; and separating the first damper ring and a second damper ring by applying oil pressure on the spaced apart adjacent axial end surfaces. Embodiments can include combinations of the above features.

Further details of these and other aspects of the subject matter of this application will be apparent from the detailed description included below and the drawings.

DESCRIPTION OF THE DRAWINGS

FIG. 2 is an axial detail cross-section view through a bearing housing showing a multi-film oil damper with three damper rings immersed in oil and contained within an oil damper cavity sealed with a radially moveable closure ring.

FIG. 3 is a schematic axial cross-section view of two cylindrical damper rings having a uniform rectangular cross-sectional profile, indicating the oil pressure exerted on the axial ends with arrows.

FIG. 4 is a schematic axial cross-section view of a first alternative where two damper rings have a rounded axial end edges at the axial ends of the cross-sectional profile.

FIG. 5 is a detail view of the axial ends of the damper rings of FIG. 4, showing the oil pressure exerted on the rounded axial end edges.

FIG. 6 is a schematic illustration of the resultant force vectors derived from the oil pressure into radially directed force vectors and an axially directed force vector, where the radially directed force vectors force the damper rings apart.

FIG. 7 is a schematic axial cross-section view of a second alternative where damper rings have a chamfered conical corners at the axial ends of the cross-sectional profile.

FIG. 8 is a detail view of the axial ends of the damper rings of FIG. 7, showing the oil pressure exerted on the conical axial end edges.

FIG. 9 is a schematic axial cross-section view of a third alternative where damper rings have a spherical outer surface and cylindrical inner surface providing a wedge gap located at the adjacent axial ends.

FIG. 10 is a detail view of the axial ends of the damper rings of FIG. 9, showing the oil pressure exerted on the axial end edges.

DETAILED DESCRIPTION

Figure 1:
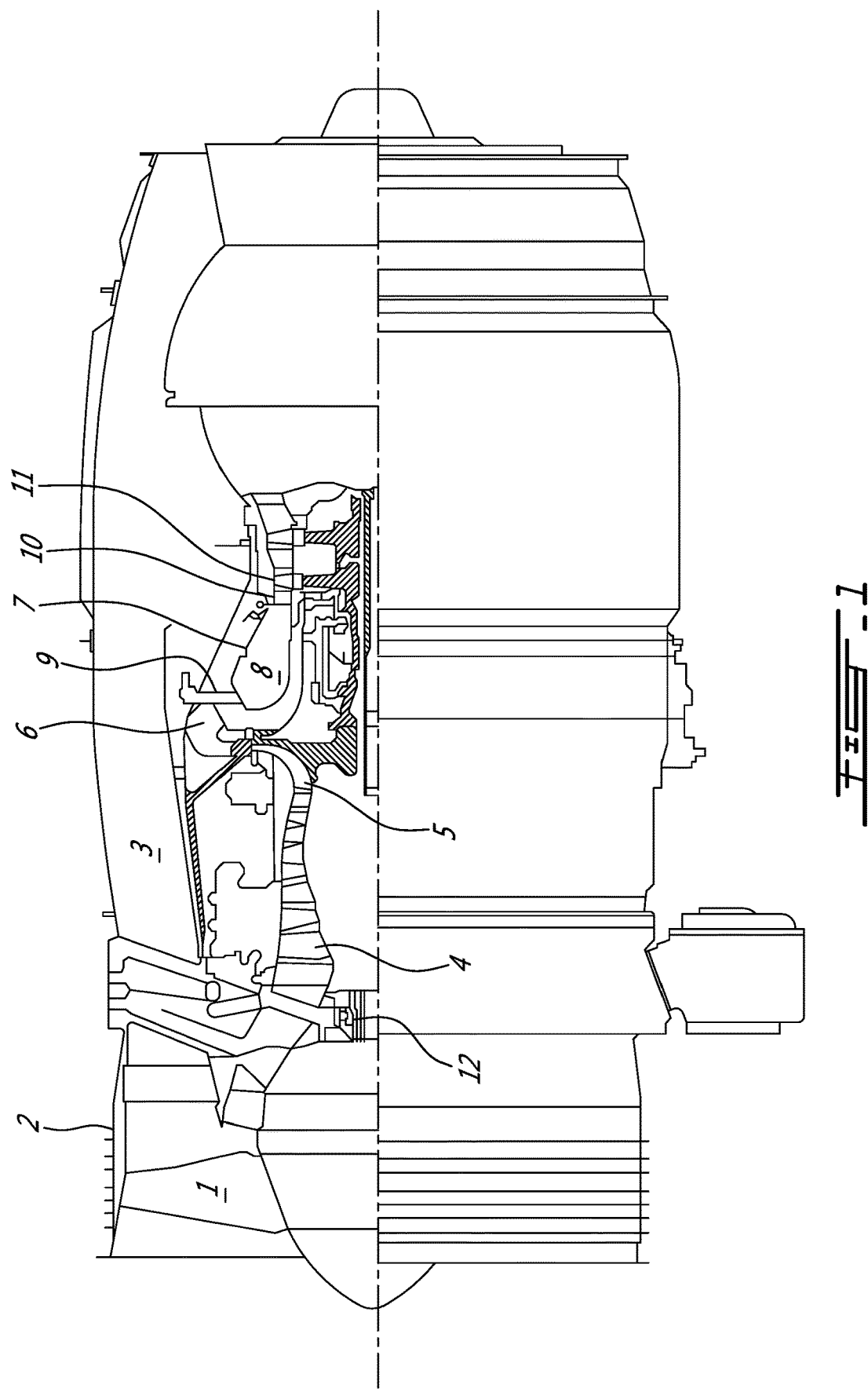
FIG. 1 shows an axial cross-section view of an example turbo-fan gas turbine engine.

FIG. 1 shows an axial cross-section through an example turbo-fan gas turbine engine. Air intake into the engine passes over fan blades 1 in a fan case 2 and is then split into an outer annular flow through the bypass duct 3 and an inner flow through the low-pressure axial compressor 4 and high-pressure centrifugal compressor 5. Compressed air exits the compressor 5 through a diffuser 6 and is contained within a plenum 7 that surrounds the combustor 8. Fuel is supplied to the combustor 8 through fuel tubes 9 and fuel is mixed with air from the plenum 7 when sprayed through nozzles into the combustor 8 as a fuel air mixture that is ignited. A portion of the compressed air within the plenum 7 is admitted into the combustor 8 through orifices in the side walls to create a cooling air curtain along the combustor walls or is used for cooling to eventually mix with the hot gases from the combustor and pass over the nozzle guide vane 10 and turbines 11 before exiting the tail of the engine as exhaust.

FIG. 1 shows a forward bearing housing 12 that supports the low pressure spool shaft with roller bearings. FIG. 2 shows an axial cross-section view through a multiple oil film damper within the bearing housing 12. The annular damper cavity is defined within the bearing housing 12 between a radially outward wall 13 and radially extending side walls 14. The annular damper cavity has an oil inlet 15 in communication with a source of pressurized oil such as an oil pump (not shown). A closure ring 16 has axial ends with seals 17 abutting the radially extending side walls 14 of the annular damper cavity. Oil from the oil inlet 15 is contained under pressure within the boundaries of the outward wall 13, side walls 14 and closure ring 16 with radially sliding seals 17.

Within the annular damper cavity, a plurality of (three in the illustrated example) damper rings 18 are shown nested coaxially. The dashed arrows show the direction of oil flow which enters from the oil inlet 15, coats all surfaces of the damper rings 18 and ultimately escapes past the sliding seals 17 which can be metal piston rings, energized seals or O-rings. FIGS. 2 and 3 show schematic views of two adjacent damper rings 18 that are cylindrical having a rectangular cross-section in an axial-radial plane. When subjected to oil pressure, as indicated by arrows in FIG. 3, the damper rings 18 have uniform oil pressure on their axial ends 19. The oil pressure does not exert any radially directed force that can serve to separate the damper rings 18 if the damper rings 18 are not separated by a gap. The oil film that coats the damper rings 18 can exert an attractive or bonding force caused by the liquid surface tension of the oil. Accordingly when damper rings 18 having a rectangular cross-section are in close proximity, the damper rings 18 may stick together and be held by the surface tension force of the oil coating.

FIGS. 4-10 show alternative configurations of various damper rings that can enable the oil pressure to create forces that separate the adjacent damper rings. Stated in general, the oil pressure is used to exert a radial force to separate the damper rings because the oil pressure can engage a tapered portion of the axial ends.

FIGS. 4-5 show a generally rectangular pair of adjacent damper rings 20, 21. The first damper ring 20 and the second damper ring 21 have a middle portion 22 and axial ends 23. In the example shown, both the first damper ring 20 and the second damper ring 22 have identical configurations, however each could have different configurations as well. As illustrated, each damper ring 20, 21 has an axial end 23 with a radial thickness "t" that is less than a radial thickness "T" of the middle portion 22.

As shown in FIG. 5, a radially inner surface 24 of the first damper ring 20 and a radially outer surface 25 of the second damper ring 21 define a wedge gap 26 therebetween. In the example of FIGS. 4-5, the first damper ring 20 and the second damper ring 21 have axial cross sectional profiles that are identical, and the wedge gap 26 is axially symmetrical, however asymmetrical configurations are equally possible. The example of FIGS. 4-5 show a cylindrical middle portion 22 with the uniform mid-portion thickness "T" and an axial end surface 23 oriented perpendicular to the cylindrical middle portion 22. The axial end edge 27 arcuately merges with a constant edge radius "r" between the cylindrical middle portion 22 and the axial end surface 23.

As indicated with arrows in FIG. 5, the oil pressure is exerted on the rounded axial end edges 27 which can be analyzed using vector resultant forces. The oil pressure exerted over the area of the axial end edges 27 produces a resultant force vector 28 (oil pressure×area=force) schematically shown in FIG. 6. The combination of vectors 28 can be converted to an axial force component 29 and a pair of opposing radial force components 30. The radial force components 30 (when not opposed by other equal or greater forces) separate the damper rings 20, 21 and allow oil to penetrate between the radially inner surface 24 and radially outer surface 25.

With reference to FIG. 2, when oil fills the annular damper cavity fully and oil pressure is generally constant within the cavity, the forces exerted on the damper rings 18 are balanced. In other words, the force of oil pressure exerted on one side of the damper ring 18 is opposed with an equal and opposite force. Therefore when oil pressure is uniform, forces are in balance and the damper rings 18 will not move. However the oil pressure within the annular damper cavity is not uniform or balanced in all conditions. When the oil is initially injected into the oil inlet 15, there is resistance to oil flow due to friction of the moving liquid against the surfaces that engage the oil. Accordingly during initial filling, the oil pressure on one side of the damper ring 18 will differ from oil pressure on an opposite side due to flow resistance or friction as oil flows through a restricted and tortuous path.

Also during engine operation under forces caused by shaft imbalance or misalignment, the closure ring 16 with seals 17 moves radially (up-down as drawn) to compress and expand the annular damper cavity. The radial movement of the closure ring 16 and seals 17 is not uniform about the circumference of the closure ring 16 but rather follows the eccentric motion of the imbalanced shaft. The annular damper cavity may be compressed in one area and will be decompressed in a radially opposite area when subjected to operating forces. Accordingly during operation under imbalanced conditions, the oil pressure within the annular damper cavity will vary and will not remain uniform. Therefore the damper rings 18 are often subjected to unequal pressures on opposite sides, which results in unequal forces and radial movement of the damper rings 18.

Stated generally, with reference to FIGS. 4-6, the present disclosure provides a method of distributing oil between the coaxial damper rings 20, 21 of a multi-film oil damper, by sealing the damper cavity with a closure ring, and injecting pressurized oil into an oil damper cavity via an oil inlet 15. The first damper ring 20 and the second damper ring 21 have spaced apart adjacent end surfaces 23 that define a wedge gap 26 with spaced apart adjacent axial end edges 27. The damper rings 20, 21 are separated by applying oil pressure on the spaced apart adjacent end edges 27. The resultant force components 30 directed in a radial direction separate the damper rings 20, 21.

FIGS. 4-6 illustrate a first alternative where the axial end edge 27 arcuately merges with a constant edge radius "r" between the cylindrical middle portion 22 and the axial end surface 23 of the otherwise cylindrical damper rings 20, 21.

FIGS. 7-8 illustrate a second alternative where damper rings 31, 32 have an axial end edge 33 in the form of a chamfered surface joining the cylindrical middle portion 34 and the axial end surface 35. Oil pressure is exerted on the chamfered axial end edge 33 as indicated with arrows.

FIGS. 9-10 illustrate a third alternative where the first damper ring 36 and the second damper ring 37 have a radially outer surface 38 that is an axially arcuate surface. In the example shown the axially arcuate surface is spherical but other three dimensional curvatures and surface configurations are possible as well. In the example illustrated a radially inner surface 39 is cylindrical but other three dimensional surfaces of revolution are possible. The shape of the wedge gap 40 has one surface that is cylindrical and an opposite side that is spherical which provides a relatively large surface area over which the oil pressure can be applied as indicated by arrows in FIGS. 9-10.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A multi-film oil damper comprising:
   a housing defining an annular damper cavity between a radially outward wall and radially extending side walls, the annular damper cavity having an oil inlet configured for connection to a source of pressurized oil;
   a closure ring defining a radially inward boundary of the annular damper cavity; and
   a first damper ring and a second damper ring nested together coaxially within the annular damper cavity,
   wherein at least one of the first damper ring and the second damper ring has an end radial thickness less than a radial thickness at a location intermediate opposed axial ends of the ring, wherein a maximum radial thickness (T) of the first damper ring and of the second damper ring is provided at a middle portion of the first damper ring and the second damper ring between the opposed axial ends thereof, and wherein the middle portion of at least one of the first damper ring and the second damper ring is cylindrical, the at least one of the first damper ring and the second damper ring having an axial end surface oriented perpendicular to the cylindrical middle portion, and defining an axial end edge between the cylindrical middle portion and the axial end surface.

2. The multi-film oil damper according to claim 1 wherein a radially inner surface of the first damper ring and a radially outer surface of the second damper ring define a wedge gap therebetween, and wherein the first damper ring and the second damper ring are symmetric about a central radial axis.

3. The multi-film oil damper according to claim 2 wherein the first damper ring and the second damper ring have axial cross sectional profiles that are identical, and wherein the wedge gap is axially symmetrical.

4. The multi-film oil damper according to claim 1 wherein the axial end edge arcuately merges between the cylindrical middle portion and the axial end surface.

5. The multi-film oil damper according to claim 1 wherein the axial end edge has a constant edge radius.

6. The multi-film oil damper according to claim 1 wherein the axial end edge is a chamfered surface joining the cylindrical middle portion and the axial end surface.

7. The multi-film oil damper according to claim 1 wherein at least one of the first damper ring and the second damper ring has one of: a radially inner axially arcuate surface, and a radially outer axially arcuate surface.

8. The multi-film oil damper according to claim 7 wherein the axially arcuate surface is spherical.

9. The multi-film oil damper according to claim 1 wherein at least one of the first damper ring and the second damper ring has one of: a radially inner cylindrical surface; and a radially outer cylindrical surface.

10. A method of distributing oil between coaxial damper rings of a multi-film oil damper, the method comprising:
    sealing an oil damper cavity with a radially moveable closure ring
    injecting pressurized oil into the oil damper cavity via an oil inlet;
    providing a first damper ring and a second damper ring within the oil damper cavity, the first damper ring and the second damper ring being coaxially nested, one of the first damper ring and the second damper ring having a spherical surface, the first damper ring and the second damper ring having axially adjacent end surfaces that are radially spaced-apart so as to define an axially symmetrical wedge gap, wherein a maximum radial thickness (T) of the first damper ring and of the second damper ring is provided at a middle portion of the first damper ring and the second damper ring; and
    separating the first damper ring and the second damper ring by applying oil pressure on the spaced apart adjacent axial end surfaces.

11. The method according to claim 10 wherein the axially adjacent end surfaces are arcuate.

\* \* \* \* \*